July 28, 1953 — R. S. COLLEY — 2,647,000
ANGULAR TUBULAR JOINT ASSEMBLY
Filed Oct. 21, 1948
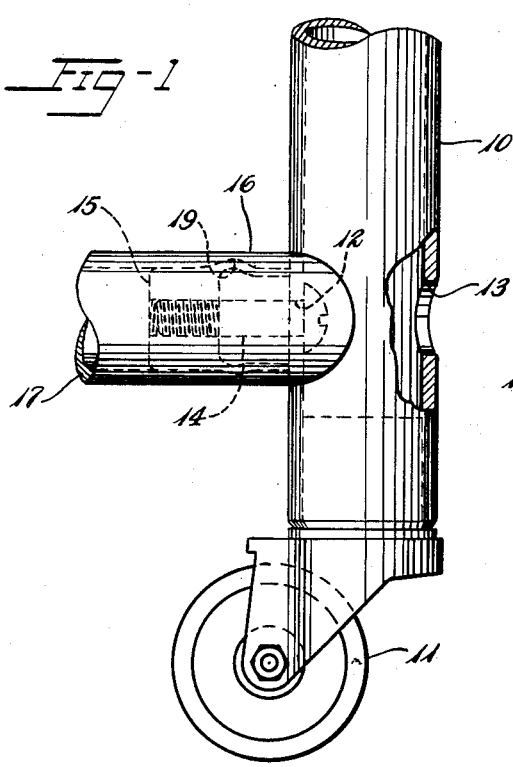
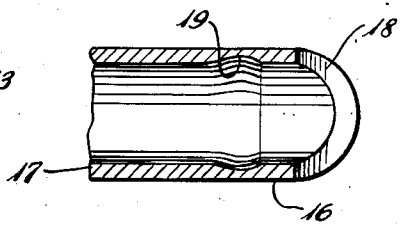
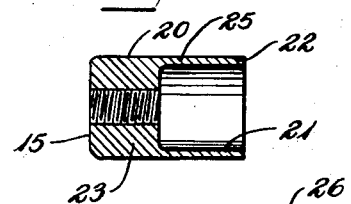
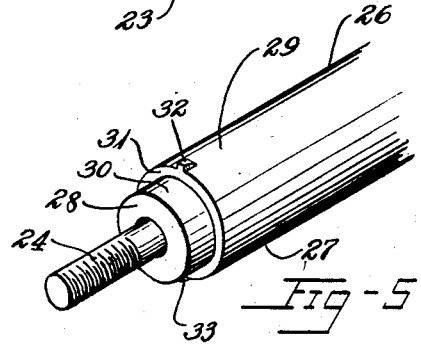
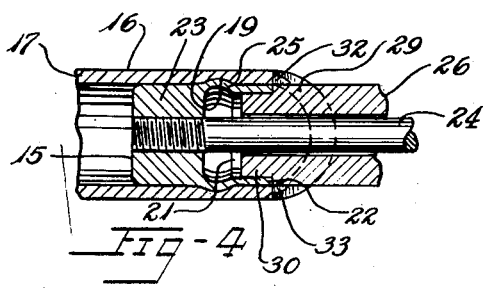
Inventor
Russell S. Colley
By Dwight L. Moody
Att'y Patented July 28, 1953

2,647,000

UNITED STATES PATENT OFFICE 2,647,000

ANGULAR TUBULAR JOINT ASSEMBLY

Russell S. Colley, Cuyahoga Falls, Ohio, assignor to The B. F. Goodrich Company, New York, N. Y., a corporation of New York Application October 21, 1948, Serial No. 55,777

3 Claims. (Cl. 287—54)

The invention relates to angular joint assemblies including methods of making the same and apparatus therefor, and especially to angular, tubular joint assemblies for structures such, for example, as furniture and other articles of manufacture wherein a tubular support frame is employed.

The manufacture of furniture having a support frame of metal tubing presents the problems of neatly and securely attaching one tubular member to another tubular member in intersecting angular relation and of avoiding cumbersomeness and unsightliness of construction. For example, such a joint assembly may be formed of circular-in-section steel tubing and arranged as a right angle, T-shaped joint.

Prior constructions have generally utilized an interiorly threaded, metal plug positioned at an end of one tubular member and welded in place, which plug is threadedly engaged by a screw fastener extending laterally through the other member so as to hold the members in assembled angular relationship. Since the tubular members may be wholly or partially exposed to view, it has been customary to nickel or chromium plate the members for improved resistance to corrosion and improved appearance. This has necessitated welding the plug in place before the electroplated finish is put on the member to avoid spoiling the plating.

In view of this, it has been difficult to drain all of the electroplating solution out of the interior of the plugged tubular member. The solution remaining inside the member attacks and corrodes the threads of the plug, the wall of the member, and the threads of the screw fastener, all of which weakens the joint assembly and introduces service difficulties.

An object of the invention is to provide for overcoming the foregoing and other difficulties and disadvantages of angular joint assemblies for tubular support structures and of the methods of making the same and the apparatus therefor.

Other objects of the invention are to provide an improved angular joint assembly for support structures; to provide an improved method of making such a joint assembly and improved apparatus therefor; to provide improved fastener means for joining the parts of the assembly; and to provide for simplicity of construction, convenience of manufacture and assembly, and for effectiveness of operation.

Further objects are to provide for the secure attachment of a tubular member to a second tubular member in intersecting angular relation thereto; to provide for engaging a tubular rivet with the inner wall only of a tubular end portion; and to provide for positioning, registering and maintaining the rivet entirely within the tubular member during the upsetting operation.

These and other objects and advantages of the invention will be apparent from the following description.

In the accompanying drawings which form a part of this specification and in which like numerals are employed to designate like parts throughout the same, Fig. 1 is a side elevation of an angular joint assembly for a tubular support frame of furniture and the like, and constructed in accordance with and embodying the invention, parts being broken away and in section, Fig. 2 is a longitudinal sectional view of an end portion of a tubular member of the assembly, Fig. 3 is a longitudinal sectional view of a tubular rivet for the assembly, Fig. 4 is a longitudinal sectional view of the tubular end portion and the rivet disposed therein in upset condition, which rivet is engaged with an upsetting apparatus therefor, parts being broken away, and Fig. 5 is a perspective view from above of the upsetting apparatus itself, parts being broken away.

In the illustrative embodiment of the angular joint assembly shown especially in Fig. 1, the construction includes a support or tubular member 10 of stiff tubing of circular, oval, or other suitable rounded form in cross-section and of steel, aluminum, plastic, or other suitable structural material adapted for the intended purpose; which support member constitutes a part of a support frame as for furniture and may have at one end a caster wheel structure 11 to facilitate moving the furniture over a floor or other supporting surface (not shown). The tubular support member 10 at a position spaced-apart from its castered end is desirably provided with diametrically opposite and laterally aligned apertures 12, 13 through the wall of the tubing. This facilitates the insertion and manipulation of a screw fastener element 14 so as to engage the threads of an interiorly threaded tubular rivet 15 entirely disposed in an end portion 16 of a supported or second tubular member 17 of suitable tubing material and to engage the wall of the support member 10 for holding the members 10, 17 in the desired intersecting angular relation to one another.

The tubular supported member 17 may be disposed with its longitudinal axis substantially perpendicular to the longitudinal axis of the support member 10, thereby providing the illustrative though not limiting example of the angular tubular joint arrangement shown in the drawings. The hollow end portion 16 of the supported member which receives the rivet 15, has at its inner surface and at a position spaced-apart from its end face 18 a continuous annular depression or groove 19 desirably of outwardly curved or rounded contour in cross-section, whereby the rivet, during upsetting, is outwardly bulged at a determinate zone or position intermediate its ends established by and coinciding with the position of the depression 19, inasmuch as the rivet, before upsetting, is supported against expansion by the wall of the end portion 16, except at the depression 19. The hollow end portion 16 at its end face 18 desirably has an inwardly curved contour in one direction laterally of the tubing so as to embrace partially and conform to the curved wall of the support member 10 laterally and longitudinally thereof to assure firm seating of the end face 18 against the support member and a neat appearance of the joint assembly, as shown especially in Figs. 1, 2 and 4.

The tubular rivet 15 is made of steel, aluminum, brass, or other suitable strong, ductile material and desirably has a continuously annular, cylindrical body 20 of substantially uniform diameter throughout its full length, as shown especially in Fig. 3. The cylindrical body 20 has a bore 21 preferably of substantially uniform diameter extending from an end 22 and terminating in an interiorly threaded portion 23 of less internal diameter adapted to be engaged by a threaded element such as the screw fastener 14 or a draw rod 24 inserted from the end 22 for fastening or for upsetting purposes. For the arrangement shown, the threaded portion 23 is spaced from and opposite the end 22 to facilitate its positioning beyond the depression 19 in the direction away from the end face 18 both before and after the upsetting operation, while the end 22 is and remains positioned at the end face 18. Also, the arrangement provides at a determinate zone between the end 22 and the portion 23 and adjacent the latter, an outwardly-collapsible, intermediate wall-portion 25 of the body relatively thin as compared to the wall of the portion 23, which wall-portion 25 is adapted to be expanded by axial pressure applied through the threads of the rivet to form a continuous, annular bulge for seating in the depression 19 in annular conformance about the wall thereof. In this manner the end portion 16 coacts with the upset rivet to securely hold the rivet in the member 17, especially against axial movement toward or away from the end face 18 of the supported member 17, and the necessity of a head or flange at the end 22 of the rivet for holding purposes is completely avoided.

In view of the particular construction and arrangement of the angular joint assembly and the rivet 15, well-known upsetting apparatus or tools having conventional flat ended anvils are not suited to upset the rivet in the end portion 16 of the tubular supported member 17. To this end the invention provides upsetting apparatus having a tubular barrel 26 and including a hollow anvil 27 having an axial bore through which the threaded draw rod 24 extends and projects beyond an end face 28 of the anvil for engagement with the threaded portion 23 of the rivet, as shown especially in Figs. 4 and 5. The anvil may be integrally or otherwise suitably united with the tubular barrel 26 of the upsetting apparatus or tool which may be any suitable kind and desirably an upsetting tool such as is described and claimed in the Harry E. Waner Patent No. 2,069,907 for Apparatus for Installing Tubular Rivets, dated February 9, 1937.

The anvil 27 includes a body portion 29 desirably cylindrical and of substantially uniform diameter which is desirably the same as the diameter of the body 20 of the rivet. The anvil has a rivet-supporting portion 30 of reduced substantially uniform diameter extending from the body portion 29 to the end face 28, which reduced diameter is desirably approximately equal to the diameter of the bore 21 of the rivet so that the portion 30 may be disposed in the bore 21 in telescopic backing relation to the wall of the rivet along part of its length from the end 22 and disposed with the end face 28 spaced from the threaded portion 23 of the rivet and adjacent the wall-portion 25, as shown especially in Fig. 4. The offset arrangement of the anvil portions 29 and 30 provides a continuous annular shoulder 31 at their juncture, whereby the shoulder 31 functions as stop means and contacts the end 22 of the rivet, when the latter, before upsetting, is mounted in the telescopic relation on the rivet-supporting portion 30.

Because of the inwardly curved contour of the end face 18 of the hollow end portion 16, the anvil body portion 29 desirably has integral therewith register means comprising at least a pair of upraised or outwardly projecting ribs 32, 33 diametrically opposite one another and extending rearwardly or away from the shoulder 31. The ribs 32, 33 seat against the end face 18 at its innermost, opposite regions of curvature, when the anvil and rivet are inserted in the end portion 16 preparatory to upsetting the rivet, and the ribs also register the end 22 of the rivet and the shoulder 31 flush with the end face 18 at the aforesaid innermost regions of curvature thereof. Thus, the ribs 32, 33 and shoulder 31 coact to not only initially register the end of the rivet with respect to the end face 18, but in addition, to make possible maintaining the registered relationship during the upsetting operation.

In making the angular joint assembly described hereinabove, the following sequence of steps, although not necessarily limited thereto, may be used. The support member 10 is drilled to provide the aligned apertures 12, 13 at the position of the supported member 17, and the end face 18 of the hollow end portion 16 is shaped to the desired inwardly curved contour for conformance to the curvature of the wall of the support member. The continuous annular depression 19 is then formed at the inner surface of the end portion 16 at the desired spaced-apart position from the end face 18 as by machining, rolling, or other suitable material-working operations. If desired, the tubular member 17 with the depression 19 may be die-cast by known apparatus and methods.

The tubular rivet is then threadedly engaged with the threads of the draw rod 24 which is inserted in the bore 21 of the rivet from the end 22, the engagement being completed when the end 22 seats against the shoulder 31 of the anvil and the rivet-supporting portion 30 is wholly disposed in the bore 21 in the aforesaid telescopic backing relation to the wall of the rivet, whereby the end face 28 is adjacent a margin of the intermediate portion 25 and spaced from the threaded portion 23 of the rivet. The rivet in engagement with the draw rod is inserted into the opening of the hollow end portion 16 until movement is stopped by the seating of the ribs 32, 33 against the end face 18 at the innermost regions of curvature thereof, whereby the end 22 of the rivet is registered flush with the end face at said regions of curvature. The rivet while maintained in such registered relationship, is upset in the end portion 16 by operation of the tool including the draw rod so as to apply axial pressure through the threads of the rivet, thereby expanding the wall of intermediate portion 25 to form the continuous annular bulge seating firmly against the wall of the depression 19 in annular conformance about the same, as shown especially in Fig. 4. The bulged portion locks the rivet against axial movement relative to the supported member and securely holds the upset rivet in such member without requiring a supplemental head or flange at the end 22 in engagement with the end face 18.

After the upsetting operation the tool is completely disengaged from the rivet. The supported member is then positioned with the end face 18 seated against the support member with the bore 21 of the rivet in alignment with one of the apertures 12 in the wall of the support member. The screw fastener element 14 is then inserted through both apertures into the bore 21 of the rivet and engaged with the threads of the threaded portion. The element 14 is tightened in the rivet until end portion 16 of the member 17 is firmly held against the support member 10, thus completing the assembly of the joint of improved strength, durability and appearance.

Variations may be made without departing from the scope of the invention as it is defined in the following claims.

I claim:

1. An angular joint assembly comprising a support member, a supported member including a tubular end portion open at one end with the end edge thereof seated against said support member, the tubular end portion of said supported member having an internal circumferential groove formed therein and spaced inwardly from said end edge, an expansible hollow rivet having a relatively thick bottom wall portion and a relatively thin tubular skirt portion, said rivet being disposed wholly in said tubular end portion with the end of the skirt portion of said rivet disposed adjacent the end edge of said tubular end portion, said rivet having a circumferential expanded wall-portion projecting radially outwardly into said circumferential groove and in peripheral conformance with the wall of the groove for anchoring the rivet in said tubular end portion, and fastening means extending between said support member and said bottom wall portion of said rivet for connecting said members.

2. An angular joint assembly comprising a support member, a supported member including a tubular end portion open at one end with the end edge thereof seated against said support member, the tubular end portion of said supported member having an internal circumferential groove formed therein and spaced inwardly from said end edge, an expansible hollow rivet having a relatively thick bottom wall portion and a relatively thin tubular skirt portion, said rivet being disposed wholly in said tubular end portion with the end of the skirt portion of said rivet disposed adjacent the end edge of said tubular end portion, said rivet having a circumferential expanded wall-portion adjacent said bottom wall portion and projecting radially outwardly into said circumferential groove in peripheral conformance with the wall of the groove for anchoring the rivet in said tubular end portion, and fastening means extending between said support member and said bottom wall portion of said rivet for connecting said members.

3. An angular joint assembly comprising a support member, a supported member including a tubular end portion open at one end with the end edge thereof seated conformingly against said support member, the tubular end portion of said supported member having an internal circumferential groove formed therein and spaced inwardly from said end edge, an expansible hollow rivet having a relatively thick internally threaded bottom wall portion and a relatively thin tubular skirt portion, said rivet being disposed wholly in said tubular end portion with the end of the skirt portion of said rivet abutting said support member, said rivet at said skirt portion thereof having a circumferential expanded wall-portion projecting radially outwardly into said circumferential groove in peripheral conformance with the wall of the groove for anchoring the rivet in said tubular end portion, and threaded fastening means extending between said support member and said bottom wall portion of said rivet for detachably connecting said members.

RUSSELL S. COLLEY.

References Cited in the file of this patent

UNITED STATES PATENTS

| Number | Name | Date |
|---|---|---|
| 192,718 | Smith | July 3, 1877 |
| 932,744 | Adams | Aug. 31, 1909 |
| 1,320,623 | Kennedy | Nov. 4, 1919 |
| 1,402,919 | Carlson | Jan. 10, 1922 |
| 1,460,923 | Tilden | July 3, 1923 |
| 1,706,113 | Hopkins | Mar. 19, 1929 |
| 1,734,025 | Zeibig | Oct. 29, 1929 |
| 2,018,250 | Cohan | Oct. 22, 1935 |
| 2,065,902 | Levin | Dec. 29, 1936 |
| 2,089,790 | Halpern | Aug. 10, 1937 |
| 2,144,701 | Campbell et al. | Jan. 24, 1939 |
| 2,149,199 | Waner | Feb. 28, 1939 |
| 2,160,263 | Fletcher | May 30, 1939 |
| 2,188,422 | Waner | Jan. 30, 1940 |
| 2,192,904 | Ferris | Mar. 12, 1940 |
| 2,343,143 | Gill | Feb. 29, 1944 |
| 2,387,154 | Kalwitz | Oct. 16, 1945 |
| 2,446,300 | Nelson et al. | Aug. 3, 1948 |
| 2,477,056 | Gookin | July 26, 1949 |

FOREIGN PATENTS

| Number | Country | Date |
|---|---|---|
| 28,348 | Great Britain | of 1910 |
| 28,729 | Australia | of 1931 |